(12) United States Patent
Hira et al.

(10) Patent No.: US 10,771,389 B2
(45) Date of Patent: Sep. 8, 2020

(54) VIRTUAL TUNNEL ENDPOINTS FOR CONGESTION-AWARE LOAD BALANCING

(71) Applicant: Nicira, Inc., Palo Alto, CA (US)

(72) Inventors: Mukesh Hira, Palo Alto, CA (US); Naga Katta, San Francisco, CA (US); Isaac Keslassy, Palo Alto, CA (US); Aditi Ghag, Palo Alto, CA (US)

(73) Assignee: NICIRA, INC., Palo Alto, CA (US)

(*) Notice: Subject to any disclaimer, the term of this patent is extended or adjusted under 35 U.S.C. 154(b) by 0 days.

(21) Appl. No.: 16/428,930

(22) Filed: May 31, 2019

(65) Prior Publication Data
US 2019/0288948 A1  Sep. 19, 2019

Related U.S. Application Data

(63) Continuation of application No. 15/485,089, filed on Apr. 11, 2017, now Pat. No. 10,320,681.

(Continued)

(51) Int. Cl.
*H04L 12/803* (2013.01)
*H04L 12/729* (2013.01)
(Continued)

(52) U.S. Cl.
CPC ........ *H04L 47/125* (2013.01); *H04L 12/4633* (2013.01); *H04L 43/0864* (2013.01);
(Continued)

(58) Field of Classification Search
None
See application file for complete search history.

(56) References Cited

U.S. PATENT DOCUMENTS 6,711,152 B1 * 3/2004 Kalmanek, Jr. ......... H04L 45/04
                                                              370/351
7,068,667 B2    6/2006 Foster et al.
(Continued)

FOREIGN PATENT DOCUMENTS

GB         2493710 A      2/2013

OTHER PUBLICATIONS

Alizadeh et al., "Conga: distributed congestion aware load balancing for data center networks", SIGCOMM '14, Proceedings of the 2014 ACM conference on SIGCOMM, pp. 503-514, Chicago Illinois, USA—Aug. 17-22, 2014, ACM New York, NY, USA (c) 2014 (Year: 2014).*

(Continued)

*Primary Examiner* — Joseph A Bednash
(74) *Attorney, Agent, or Firm* — SU IP Consulting

(57) ABSTRACT

Example methods are provided for a source virtual tunnel endpoint (VTEP) to perform congestion-aware load balancing in a data center network. The method may comprise the source VTEP learning congestion state information associated with multiple paths provided by respective multiple intermediate switches connecting the source VTEP with a destination VTEP. The method may also comprise the source VTEP receiving second packets that are sent by a source endpoint and destined for a destination endpoint; and selecting a particular path from multiple paths based on the congestion state information. The method may further comprise the source VTEP generating encapsulated second packets by encapsulating each of the second packets with header information that includes a set of tuples associated with the particular path; and sending the encapsulated second packets to the destination endpoint.

15 Claims, 5 Drawing Sheets

Related U.S. Application Data

(60) Provisional application No. 62/321,730, filed on Apr. 12, 2016.

(51) Int. Cl.

| | | |
|---|---|---|
| *H04L 12/715* | (2013.01) | |
| *H04L 12/46* | (2006.01) | |
| *H04L 12/26* | (2006.01) | |
| *H04L 12/707* | (2013.01) | |
| *H04L 12/721* | (2013.01) | |
| *H04L 12/801* | (2013.01) | |
| *H04L 29/06* | (2006.01) | |

(52) U.S. Cl.
CPC ............ *H04L 45/125* (2013.01); *H04L 45/24* (2013.01); *H04L 45/38* (2013.01); *H04L 45/64* (2013.01); *H04L 47/115* (2013.01); *H04L 69/22* (2013.01); *H04L 2212/00* (2013.01)

(56) References Cited

U.S. PATENT DOCUMENTS

| 8,671,176 | B1 | 3/2014 | Kharitonov et al. | |
|---|---|---|---|---|
| 2002/0145981 | A1 | 10/2002 | Klinker et al. | |
| 2002/0150229 | A1* | 10/2002 | Riihinen | H04L 47/10 |
| | | | | 379/221.01 |
| 2007/0283024 | A1 | 12/2007 | Landrum et al. | |
| 2011/0302346 | A1* | 12/2011 | Vahdat | H04L 49/40 |
| | | | | 710/301 |
| 2013/0100816 | A1 | 4/2013 | Bergamasco et al. | |
| 2014/0047252 | A1 | 2/2014 | Ansari et al. | |
| 2016/0277953 | A1 | 9/2016 | Andersson et al. | |
| 2017/0295100 | A1 | 10/2017 | Hira et al. | |
| 2017/0295101 | A1 | 10/2017 | Hira et al. | |
| 2018/0131617 | A1 | 5/2018 | Hira | |
| 2019/0104075 | A1 | 4/2019 | Li et al. | |

OTHER PUBLICATIONS

Nanxi Kang et al., "Optimizing the "One Big Switch" Abstraction in Software-Defined Networks", CoNEXT'13, Dec. 9-12, 2013, ACM.
Mohammad Alizadeh et al., "On the Data Path Performance of Leaf-Spine Datacenter Fabrics", IEEE 21st Annual Symposium on High-Performance Interconnects, 2013, pp. 71-74.
Jonathan Perry et al., "Fastpass: A Centralized "Zero-Queue" Datacenter Network", SIGCOMM, 2014, pp. 307-318, ACM.
Vimalkumar Jeyakumar et al., "EyeQ: Practical Netwok Performance Isolation at the Edge", 10th USENIX Symposium on Networked System Design and Implementation (NSDI'13), 2013, pp. 297-311, USENIX Association.
Lucian Popa et al., "FairCloud: Sharing the Network in Cloud Computing", HotNets-X, (New York, NY, USA), pp. 22:1-22:6, ACM, 2011.
Mohammad Alizadeh et al., "pFabric: Minimal Near-Optimal Datacenter Transport", SIGCOMM'13, Aug. 12-16, 2013, ACM.
Mosharaf Chowdhury et al., "Efficient Coflow Scheduling with Varys", SIGCOMM'14, Aug. 17-22, 2014, ACM.
Mohammad Al-Fares et al., "Hedera: Dynamic Flow Scheduling for Data Center Networks", NSDI 2010, (Berkeley, CA, USA), pp. 19-19, USENIX Association.
Theophilus Benson et al., "MiceroTE: Fine Grained Traffic Engineering for Data Centers", CoNEXT 2011, Dec. 6-9, 2011, ACM.
Jiaxin Cao et al, "Per-packet Load-balanced, Low-Latency Routing for Clos-based Data Center Networks", CoNEXT' 13, Dec. 9-12, 2013, pp. 49-60, ACM.
Srikanth Kandula et al., "Dynamic Load Balancing Without Packet Reordering", ACM SIGCOMM Computer Communication Review, Apr. 2007, pp. 53-62, No. 2, vol. 37.
Siddhartha Sen et al, "Scalable, Opimal Flow Routing in Datacenters via Local Link Balancing", CoNEXT'13, Dec. 9-12, 2013, ACM.

Mohammad Alizadeh et al., "Conga: Distributed Congestion-Aware Load Balancing for Datacenters", SIGCOMM'14, Aug. 17-22, 2014, ACM.
Chi-Yao Hong et al., "Achieving High Utilization with Software-Driven WAN", SIGCOMM'13, Aug. 12-16, 2013, pp. 15-26, ACM.
Sushant Jain et al., "B4: Experience with a Globally-Deployed Software Defined WAN", SIGCOMM'13, Aug. 12-16, 2013, ACM.
Pat Bosshart et al., "Forwarding Metamorphosis: Fast Programmable Match-Action Processing in Hardware for SDN", SIGCOMM'13, Aug. 12-16, 2013, ACM.
International Search Report and Written Opinion of the International Searching Authority, International application No. PCT/US2017/027190, dated Jun. 9, 2017.
"Cavium and XPliant Introduce a Fully Programmable Switch Silicon Family Scaling to 3.2 Terabits per Second", News & Evnet, Retrieved on Aug. 24, 2017 from the Internet at <URL: http://tinyurl.com/nzbqtr3>.
Pat Bosshat et al., "P4: Programming Protocal-Independent Packet Processors", ACM SIGCOMM Computer Communication Review, Jul. 2014, pp. 88-95, No. 3, vol. 44.
Naga Katta et al., "Hula: Scalable Load Balancing Using Programmable Data Planes", SOSR'16, Mar. 14-15, 2016, ACM.
Radhika Niranjan Mysore et al., "PortLand: A Scalable Fault-Tolerant Layer 2 Data Center Network Fabric", SIGCOMM'09, Aug. 17-21, 2009, ACM.
"Cisco's Massively Scalable Data Center", Sep. 2015, Retrieved from <URL: http://www.cisco.com/c/dam/en/us/td/docs/solutions/Enterprise/Data_Center/MSDC/1-/MSDC_AAG_1.pdf>.
"BCM56850 Series: High-Capacity StrataXGS Trident II Et ernet Switc Series", Broadcom, Retrieved on Aug. 25, 2017 from the Internet at <URL: http://www.broadcom.com/products/Switching/Data-Center/BCM56850-Series>.
Shuihai Hu et al., "Explicit Path Control in Commodity Data Centers: Design and APplications", Proceedings of the 12th USENIX Symposium on Networked Systems Design and Implementation (NSDI'15), May 4-6, 2015, pp. 15-28.
Albert Greenberg et al., "VL2: A Scalable and Flexible Data Center Network", SIGCOMM'09, Aug. 17-21, 2009, ACM.
Chuanxiong Guo et al., "BCube: A High Performance, Server-centric Network Architecture for Modular Data Centers", SIGCOMM'09, Aug. 17-21, 2009, pp. 63-74, ACM.
Eleftheria Athanasopoulou et al., "Backpressure-based Packet-by-Packet Adaptive Routing in Communication Networks", IEEE/ACM Trans. Netw., vol. 21, pp. 244-257, Feb. 2013.
Baruch Awerbuch et al., "A Simple Local-Control Approximation Algorithm for Multicommodity Flow", Proceedings of the 34th IEEE Conf. on Found. of Computer Science, Oct. 1993.
"The P4 Language Specification", The P4 Language Consortium—Version 1.1.0, Nov. 18, 2015, pp. 109.
Sivasankar Radhakrishnan et al., "Dahu: Commodity Switches for Direct Connect Data Center Networks", ANCS, 2013, pp. 59-70, IEEE Press.
Anirudh Sivaraman et al., "Packet Transactions: A Programming Model for Data-Plane Algorithms at Hardware Speed", CoRR, 2015.
"Protocol-independent Switch Architecture," Jun. 4, 2015, Retrieved from <URL: http://schd.ws/hosted_files/p4workshop2015/c9/NickM-P4-Workshop-Jun-04-2015.pdf>.
"Members of the p4 consortium", Retrieved from <URL: http://p4.org/join-us/>.
Anirudh Sivaraman, "P4's Action-execution Semantics and Conditional Operators," Massachusetts Institute of Technology, Retrieved from the <URL: https://github.com/anirudhSK/p4-semantics/raw/master/p4-semantics.pdf>.
Mohammad Alizadeh et al., Data Center TCP (DCTCP), SIGCOMM'10, Aug. 30-Sep. 3, 2010, ACM.
Keqiang He et al., "Presto: Edge-based Load Balancing for Fast Datacenter Networks", SIGCOMM'15, Aug. 17-21, 2015, ACM.
Costin Raiciu et al., "Improving Datacenter Performance and Robustness with Multipath TCP", SIGCOMM'11, Aug. 15-19, 2011, pp. 266-277, ACM.

(56) References Cited

OTHER PUBLICATIONS

Wei Bai et al., "Information-Agnostic Flow Scheduling for Commodity Data Center", NSDI'15, 2015, pp. 455-468, USENIX Association.
David Zats et al., "DeTail: Reducing the Flow Completion Time Tail in Datacenter Networks", SIGCOMM'12, Aug. 13-17, 2012, pp. 139-150, ACM.
Srikanth Kandula et al., "Walking the Tightrope: Responsive Yet Stable Traffic Engineering", SIGCOMM'05, Aug. 21-26, 2005, ACM.
Anwar Elwalid et al., "MATE: MPLS Adaptive Traffic Engineering", IEEE INFOCOM, 2001.
Nithin Michael et al., "HALO: Hop-by-Hop Adaptive Link-State Optimal Routing", IEEE/ACM Transactions on Networking, Dec. 2015, pp. 1862-1875, No. 6, vol. 23.
M. Mahalingam et al., "Virtual eXtensible Local Area Network (VXLAN): A Framework for Overlaying Virtualized Layer 2 Networks ovr Layer 3 Networks", Informational, IETF RFC 7348, Aug. 2014.
Zhiruo Cao et al., "Performance of Hasing-Based Schemes for Internet Load Balancing", IEEE INFOCOM, 2000, pp. 332~341.
Communication Pursuant to Article 94(3) EPC, Application No. 17 719 462.8-1216, dated Oct. 9, 2019.
Nathan Farrington et al., "Data Center Switch Architecture in the Age of Merchant Silicon", 17th IEEE Symposium on High Performance Interconnects, 2009, pp. 93~102.

\* cited by examiner

VIRTUAL TUNNEL ENDPOINTS FOR CONGESTION-AWARE LOAD BALANCING

CROSS-REFERENCE TO RELATED APPLICATIONS

The present application is a continuation under 35. U.S.C. § 120 of U.S. patent application Ser. No. 15/485,089 filed Apr. 11, 2017, which claims the benefit of U.S. Provisional Application No. 62/321,730 filed Apr. 12, 2016. The U.S. Patent Applications and the U.S. Provisional Application are incorporated by reference herein.

BACKGROUND

Unless otherwise indicated herein, the approaches described in this section are not admitted to be prior art by inclusion in this section.

Data center networks generally employ multi-rooted topologies that are characterized by a large degree of multipathing. For example, physical servers are connected with each other using a number of switches that provide alternative paths for packet forwarding. When a physical server has data to send to another physical server, one of the paths may be selected to transmit the data as a flow of packets. In practice, traffic may not be evenly distributed across the different paths, which may cause over-utilization of one path and under-utilization of another. Load balancing is important to spread the traffic as evenly as possible to reduce congestion and improve network performance.

DETAILED DESCRIPTION

Figure 1:
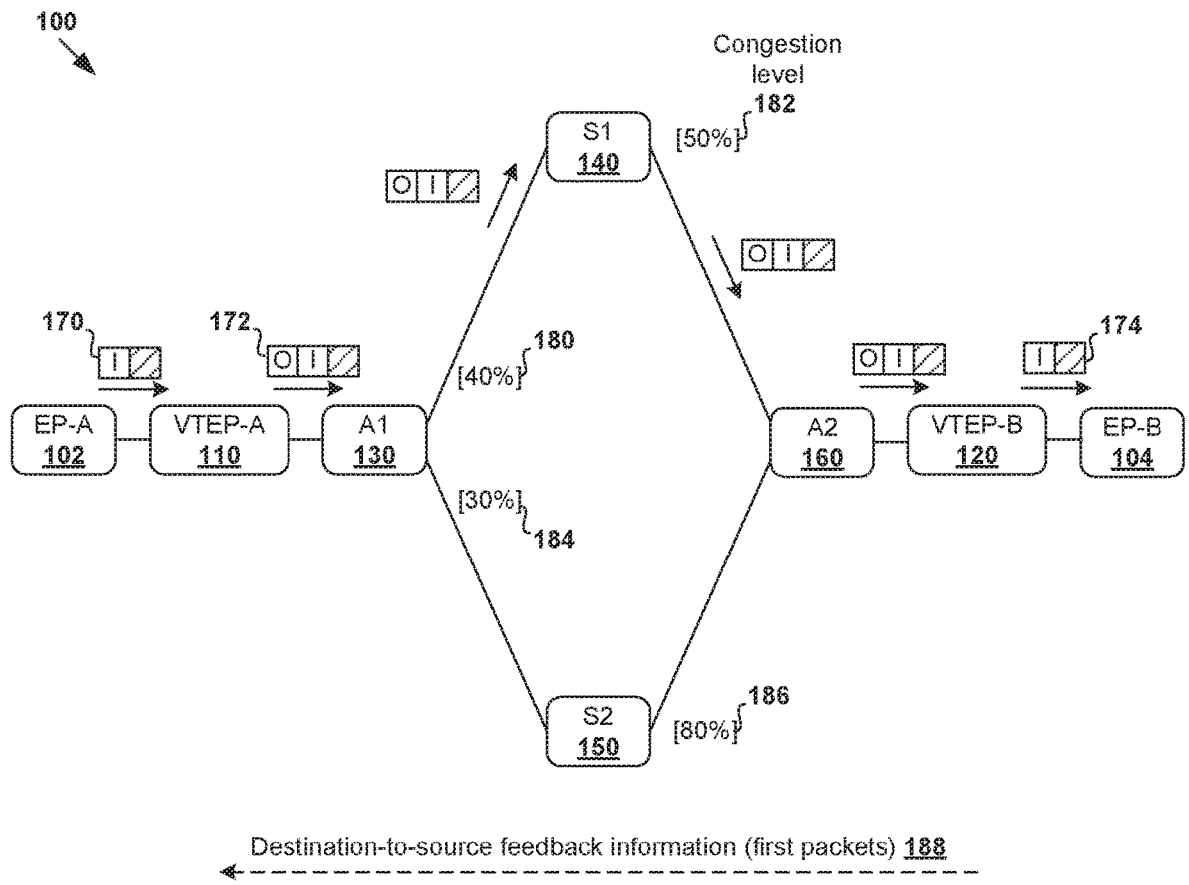
FIG. 1 is a schematic diagram illustrating example data center network in which congestion-aware load balancing is performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of load balancing in data center networks will be described in more detail with reference to FIG. 1, which is a schematic diagram illustrating example data center network 100 in which congestion-aware load balancing is performed. It should be understood that data center network 100 may include additional and/or alternative components than that shown, depending on the desired implementation.

In the example in FIG. 1, data center network 100 includes first endpoint 102 (see "EP-A") and second endpoint 104 (see "EP-B") that are connected via multiple paths provided by virtual tunnel endpoints (VTEPs), such as "VTEP-A" 110 and "VTEP-B" 120. "VTEP-A" 110 is connected to "VTEP-B" 120 via multiple paths provided by multiple intermediate switches, such as "A1" 130, "S1" 140, "S2" 150 and "A2" 160. When forwarding data packets from source "EP-A" 102 to destination "EP-B" 104, the data packets may travel over one of the following: a first path via "A1" 130, "S1" 140 and "A2" 160, and a second path via "A1" 130, "S2" 150 and "A2" 160.

In practice, the term "virtual tunnel endpoints" (e.g., "VTEP-A" 110 and "VTEP-B" 120) may refer to any suitable network elements configured to provide packet forwarding services, load balancing services, gateway services, etc., to endpoints (e.g., "EP-A" 102 and "EP-B" 104). VTEP 110/120 may be implemented by one or more physical or virtual entities. For example, VTEP 110/120 may be implemented by a hypervisor (e.g., a virtual switch of the hypervisor) supported by physical computing device (e.g., edge device, physical server, etc.). VTEP 110/120 and its associated endpoint 102/104 may reside on the same physical computing device, or on different computing devices. For example, "EP-A" 102 may be a virtual machine and "VTEP-A" 110 a virtual switch supported by the same physical server. In another example, "EP-A" 102 may be a virtual machine supported by a first physical server, and "VTEP-A" 110 a virtual switch supported by a second physical server or a physical top-of-rack (ToR) switch connected to the first physical server.

The term "endpoint" (e.g., "EP-A" 102 and "EP-B 104) may refer generally an originating node ("source endpoint") or terminating node ("destination endpoint") of a bi-directional inter-process communication flow. In practice, an endpoint may be a physical computing device (e.g., physical server, physical host), virtualized computing instance supported by a physical computing device, etc. A virtualized computing instance may represent a workload, virtual machine, addressable data compute node, isolated user space instance, etc. In practice, any suitable technology may be used to provide isolated user space instances, including but not limited to hardware virtualization. Other virtualized computing instances may include containers (e.g., running on top of a host operating system without the need for a hypervisor or separate operating system such as Docker, etc.; or implemented as an operating system level virtualization), virtual private servers, etc. The virtual machines may also be complete computational environments, containing virtual equivalents of the hardware and software components of a physical computing system. The term "hypervisor" may refer generally to a software layer or component that supports the execution of multiple virtualized computing instances, including system-level software that supports namespace containers such as Docker, etc.

The term "switch" (e.g., "A1" 130, "S1" 140, "S2" 150 and "A2" 160) may refer generally to any suitable network element configured to receive and forward packets, which may be layer-3 router, layer-2 switch, gateway, bridge, etc. Depending on the network topology, a switch may be a ToR switch, aggregate switch, spine switch, etc. Although two alternative paths are shown in FIG. 1 for simplicity, the number of paths depends on the number of inter-connected switches and the topology of data center network 100, such as a multi-rooted topology (e.g., leaf-spine topology, fat-tree topology, etc.). Further, there may be additional switches connecting "VTEP-A" 110 to "VTEP-B" 120 than that shown in FIG. 1.

The term "layer-2" generally refers to a data link layer (e.g., Media Access Control (MAC) or Ethernet layer), "layer-3" to a network layer (e.g., Internet Protocol (IP) layer), and "layer-4" to a transport layer (e.g., Transmission Control Protocol (TCP) layer) in the Open System Interconnection (OSI) model, although the concepts described herein may be applicable to other networking models. The term "packet" may refer generally to a group of bits that can be transported together, and may be in another form, such as "frame", "message", "segment", etc.

To provide connectivity between "VTEP-A" 110 and "VTEP-B" 120, a "tunnel" (not shown for simplicity) may be established between the VTEPs using any suitable protocol (e.g., Generic Network Virtualization Encapsulation (GENEVE), Stateless Transport Tunneling (STT) or Virtual eXtension Local Area Network (VXLAN)). The term "tunnel" may generally refer to an end-to-end, bi-directional communication path between a pair of VTEPs. In this case, before forwarding data packets (see 170 in FIG. 1) from "EP-A" 102, "VTEP-A" 110 performs encapsulation to generate encapsulated packets (see 172 in FIG. 1).

In more detail, each data packet 170 includes "inner header information" (labelled "I" in FIG. 1) and application data as payload. The inner header information may include a layer-2 header, a layer-3 header, a layer-4 header, etc. After encapsulation, each encapsulated packet 172 includes outer header information (labelled "O" in FIG. 1), and data packet 170 as payload. The "outer header information" (also known as "outer tunnel header") may include an outer layer-2 header, an outer layer-3 header, an outer layer-4 header, etc. The encapsulation is performed such that the fabric overlay (e.g., formed by 130-160) only needs to perform packet forwarding between a pair of VTEPs based on the outer tunnel header.

In practice, traffic load may be unevenly spread among different paths in data center network 100, which may cause congestion and performance degradation. Conventionally, equal cost multipath routing (ECMP) is commonly used as a data plane load balancing mechanism to spread traffic uniformly across multiple paths with equal costs (e.g., equal number of hops). ECMP switches use a simple, hash-based load balancing scheme to assign each new traffic flow to one of the available paths at random. ECMP is usually implemented in custom silicon (e.g., application-specific integrated circuit (ASIC)), which lacks flexibility to update the load balancing scheme. Further, ECMP is congestion-agnostic and does not protect against oversubscription of paths that causes performance degradation.

For example in FIG. 1, links connecting different pairs of switches have different congestion levels, as indicated using queue occupancy levels (see 180-186 in square brackets) for packets travelling from "EP-A" 102 to "EP-B" 104. Along the first path via "S1" 140, the queue occupancy levels are 40% (see 180) and 50% (see 182). Along the second path via "S2" 150, the queue occupancy levels are 30% (see 184) and 80% (see 186). Since ECMP does not consider the different congestion levels, it is possible that long-running flows are assigned to the second path via "S2" 150, which is suffering congestion with a queue occupancy level of 80% (see 186).

Conventionally, control-plane load balancing mechanisms have also been used to address the shortcomings of ECMP. In this case, instead of selecting paths at random, a central controller is deployed in data center network 100 to collect statistics from, and push forwarding rules to, "A1" 130, "S1" 140, "S2" 150 and "A2" 160 to implement control-plane load balancing. However, since a central controller is required, control-plane mechanisms are relatively slow due to high control loop latency and incapable of handling highly volatile traffic.

Conventionally, host-based approaches have also been used to address the shortcomings of ECMP. For example, a modified version of transmission control protocol (TCP) called multipath TCP (MPTCP) may be used to establish multiple subflows between endpoints to split traffic over different paths. However, host-based approaches usually require changes to all the endpoints, such as modifying the TCP/IP stack of the "EP-A" 102 and "EP-B" 104 in the case of MPTCP. Such changes are usually challenging (and impossible in some cases), especially when "EP-A" 102 and "EP-B" 104 are running different operating systems, or controlled by different entities.

Congestion-Aware Load Balancing

According to examples of the present disclosure, a congestion-aware load balancing approach may be implemented by "VTEP-A" 110 in a manner that is completely oblivious to associated "EP-A" 102. Unlike the conventional approaches discussed above, examples of the present disclosure may be implemented without necessitating modification to "EP-A" 102 to implement MPTCP, or modification to intermediate switches 130-160 to implement a new load balancing scheme. Further, unlike control plane load balancing mechanisms, it is not necessary to deploy a central controller to perform congestion monitoring and push forwarding rules intermediate switches 130-160.

Figure 2:
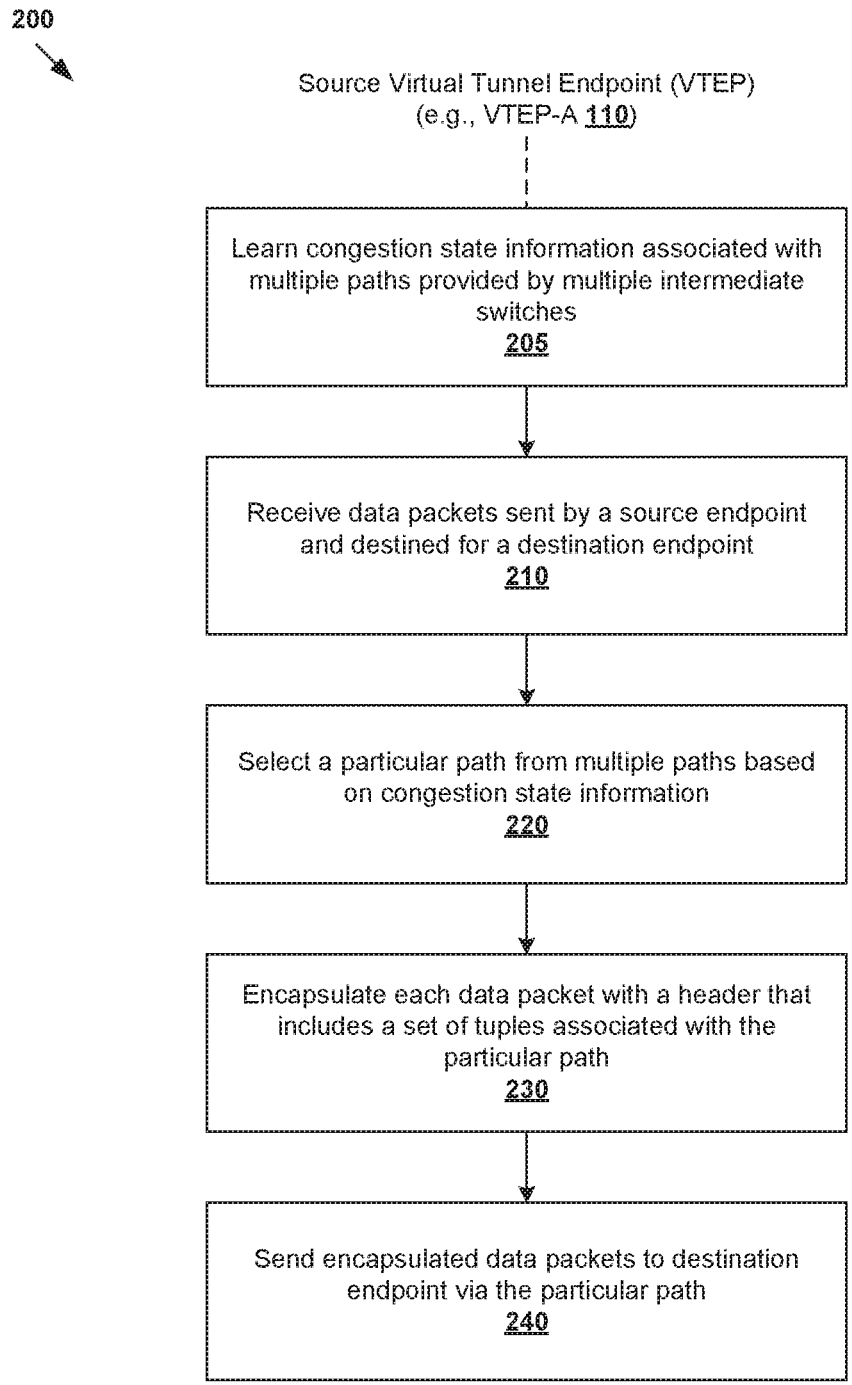
FIG. 2 is a flowchart of an example process for a source virtual tunnel endpoint (VTEP) to perform congestion-aware load balancing in a data center network.

In more detail, FIG. 2 is a flowchart of example process 200 for source VTEP 110 to perform congestion-aware load balancing in data center network 100. Example process 200 may include one or more operations, functions, or actions illustrated by one or more blocks, such as 205 to 240. The various blocks may be combined into fewer blocks, divided into additional blocks, and/or eliminated depending on the desired implementation.

In the following, "VTEP-A" 110 will be used as an example source VTEP; "VTEP-B" 120 as an example destination VTEP; "S1" 140 and "S2" 150 as example intermediate switches; "EP-A" 102 as "source endpoint"; and "EP-B" 104 as "destination endpoint." Although queue occupancy level is used as one example to indicate congestion in data center network 100 in FIG. 1, it should be understood that any other suitable indicator of congestion may be used, such as link utilization level, round trip time (RTT), etc.

At 205 in FIG. 2, "VTEP-A" 110 learns congestion state information (see 190 in FIG. 1) associated with multiple paths provided by intermediate switches 130-160 that connect "VTEP-A" 110 with "VTEP-B" 120. The congestion state information may be learned based on first packets representing destination-to-source feedback information (see 188 in FIG. 1) from "VTEP-B" 120. At 210 in FIG. 2, "VTEP-A" 110 receives second (data) packets 170 that are sent by "EP-A" 102 and destined for "EP-B" 104. For example, second packets 170 may include application data from an application running on "EP-A" 102 to another application running on "EP-B" 104. Each second packet 170 generally includes inner header information (labelled "I" in FIG. 1) associated with the inter-process communication between "EP-A" 102 and "EP-B" 104.

At 220 in FIG. 2, "VTEP-A" 110 selects a particular path (also referred to as "selected path") from the multiple paths. For example in FIG. 1, based on congestion state information associated with the multiple paths, "VTEP-A" 110 may select the first path via "A1" 130, "S1" 140 and "A2" 160. At 230 in FIG. 2, "VTEP-A" 110 generates encapsulated second packets 172 by encapsulating each of second packets 170 with (outer) header information that includes a set of tuples associated with the path selected at 220. At 240 in FIG. 2, "VTEP-A" 110 sends encapsulated second packets 172 to destination "EP-B" 104 such that encapsulated second packets 172 are forwarded via the selected path based on the set of tuples.

As will be explained further using FIG. 3, "VTEP-A" 110 may rely on congestion state information (see 190 in FIG. 1), which associates different outer source port numbers (see source_PN 192) with respective paths (see path_ID 194) and flags indicating congestion (see congestion_flag 196). For example, prior to performing packet forwarding, "VTEP-A" 110 may perform path learning to learn the mapping between source_PN 192 and path_ID 194. For the first path via "S1" 140, source_PN=SP1 and path_ID=P1. For the second path via "S2" 150, source_PN=SP2 and path_ID=P2.

As will be explained further using FIG. 3, "VTEP-A" 110 may learn the mapping between different pairs of source_PN 192 and congestion_flag 196. In one example, "VTEP-A" 110 may rely on existing capabilities intermediate switches 130-160, such as Explicit Congestion Notification (ECN) that facilitates end-to-end notification of congestion state information in data center network 100, etc. In this case, instead of dropping packets, intermediate switches 130-160 perform packet marking as a form of congestion notification to inform "VTEP-B" 120 of a present or pending congestion associated with a particular path. "VTEP-B" 120 subsequently reports any congestion notification to "VTEP-A" 110 (see 188 in FIG. 1). Besides ECN, any other suitable approach may be used to learn the congestion state information. For example, as will be described further using FIG. 4A and FIG. 4B, "VTEP-A" 110 may measure an RTT between "VTEP-A" 110 and "VTEP-B" 120.

In the example in FIG. 1, each encapsulated second packet 172 includes outer header information that includes a set of tuples associated with the selected path. In particular, each encapsulated second packet 172 includes outer header information (labelled "O") such as an outer layer-2 header, an outer layer-3 header and an outer layer-4 header. The set of tuples may include a source port number, destination port number, source IP address, destination IP address and protocol. For the first path via "S1" 140 (i.e., path_ID=P1), the outer layer-4 header may include a source port number having the value of source_PN=SP1. The source port number is set such encapsulated packets 172 are forward via "A1" 130, "S1" 140 and "A2" 160 along the selected path. At destination "VTEP-B" 120, decapsulation is performed to remove outer header information, data packets 174 sent to "EP-B" 104.

Using example process 200, "VTEP-A" 110 may distribute virtual network traffic over different paths in data center network 100, taking into account congestion state information 190 associated with the different paths. "VTEP-A" 110 may select a different outer source port number every time it wants to send encapsulated second packets 172 on a different path. Since intermediate switches 130-160 connecting "VTEP-A" 110 and "VTEP-B" 120 will perform load balancing based on the outer header information, the outer source port number in the outer layer-4 header may be used as an entropy to exploit multiple paths (e.g., equal-cost paths) in data center network 100.

Congestion State Information

Figure 3:
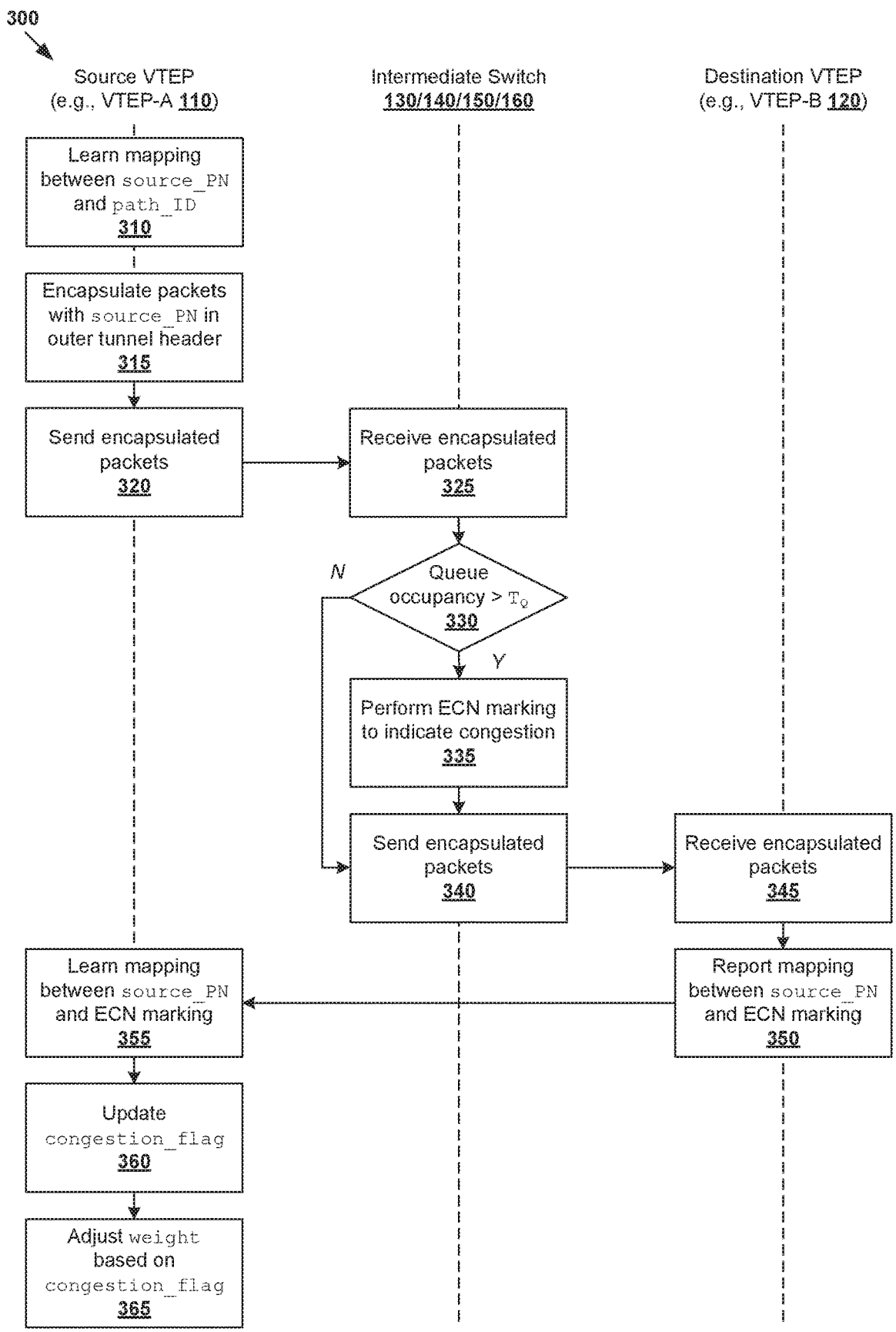
FIG. 3 is a flowchart of a first example process for a source VTEP to learn congestion state information in a data center network.

FIG. 3 is a flowchart of first example process 300 for source VTEP 110 to learn congestion state information 190 in data center network 100 according to a first example. Example process 300 may include one or more operations, functions, or actions illustrated by one or more blocks, such as 310 to 365. The various blocks may be combined into fewer blocks, divided into additional blocks, and/or eliminated depending on the desired implementation. Using the example in FIG. 1, example process 300 may be performed by "VTEP-A" 110.

At 310 in FIG. 3, "VTEP-A" 110 learns the mapping or association between multiple pairs of source_PN 192 and path_ID 194. For example in FIG. 1, different values of source_PN 192 may lead to different, non-overlapping ECMP paths in data center network 100. The mapping represents a priori knowledge of different paths from which "VTEP-A" 110 may choose for packet forwarding. When ECMP hashing is applied to a set of tuples that includes a particular value of source_PN 192, the result is the associated path identified by path_ID 194.

In practice, "VTEP-A" 110 may implement a background daemon (e.g., modeled after Paris traceroute) to send periodic probe packets to all other VTEPs in data center network 100 to collect "traceroute" style information about all interface IPs encountered on each path. "VTEP-A" 110 may rotate the outer source port number in the outer header information of each probe packet to collect the path trace for each port number. "VTEP-A" 110 then updates congestion state information 190 to add or update source_PN 192 every time the corresponding probe pathtrace differs from the collected traces so far.

Blocks 315 to 360 in FIG. 3 relate to "VTEP-A" 110 learning congestion state information 190 that associates a path identified by path_ID 194 and congestion_flag 196 indicating congestion along that path. In particular, at 315 and 320 in FIG. 3, "VTEP-A" 110 encapsulates packets with an outer tunnel header that includes a particular value of source_PN 192 and sends encapsulated packets.

In the example in FIG. 3, "VTEP-A" 110 may rely on a congestion notification capability of existing switches, such as ECN marking to indicate a present or pending congestion, etc. Detailed information of ECN may be found in the Internet Engineering Task Force (IETF) Request for Comments number 3168 and entitled "The Addition of Explicit Congestion Notification (ECN) to IP," which is incorporated herein in its entirety by reference. Although ECN is described as an example, it should be understood that any other suitable packet marking approach may be used.

At 325, 330, 335 and 340 in FIG. 3, in response to receiving encapsulated packets from "VTEP-A" 110, a switch (e.g., "S1" 140, "S2" 150) may perform ECN marking to flag congestion at that switch before forwarding the encapsulated packets. In this case, the switch is known as an ECN-enabled switch that is capable of modifying header information (e.g., in a reserved field of a TCP header) of the encapsulated packets as a form of congestion notification.

For example in FIG. 1, when the queue occupancy level (e.g., 80%) at "S2" 150 exceeds a predetermined threshold (e.g., $T_Q$=60%), "S2" 150 marks packets received from "VTEP-A" 110 to notify "VTEP-B" 120 of the congestion, thereby indicating that the second path is a congested path. On the other hand, it is not necessary for "S1" 140 to perform any packet marking because associated queue occupancy level (e.g., 50%) is below the threshold, thereby indicating that the first path is an uncongested path.

At 345 and 350 in FIG. 3, destination "VTEP-B" 120 receives an encapsulated packet and reports the mapping between outer source port number in the outer header information and any congestion notification (e.g., ECN marking) to source "VTEP-A" 110 (see also 188 in FIG. 1). At 355 and 360 in FIG. 3, "VTEP-A" 110 updates the mapping between source_PN 192 and associated congestion_flag 196 (i.e., flag information). For example in FIG. 1, "VTEP-A" 110 determines that congestion_flag=false for source_PN=SP1 for the first path via "S1" 140, and congestion_flag=true for source_PN=SP1 for the second path via "S2" 150.

The congestion_flag may be used in a weighting algorithm that influences the likelihood of the selection of its associated path. At the beginning of the load balancing process, "VTEP-A" 110 may start off with equal weighting for all equal-cost paths discovered by the path learning function at 310 in FIG. 3. Subsequently, at 365 in FIG. 3, the path weight (see weight 198 in FIG. 1) is adjusted based on congestion_flag. For example, in response to determination that congestion_flag=false (i.e., clear), the weight=w1 associated with the first path via "S1" 140 is increased to increase its likelihood for selection. On the other hand, in response to determination that congestion_flag=true (i.e., set), the weight=w2 associated with the second path via "S2" 150 is decreased to reduce its likelihood for selection.

Another metric that may be used to indicate congestion is RTT that may be measured and actively kept track of for each path. An example is described using FIG. 4A, which is a flowchart of second example process 400 for source VTEP 110 to learn congestion state information in data center network 100. Example process 400 may include one or more operations, functions, or actions illustrated by one or more blocks, such as 410 to 455. The various blocks may be combined into fewer blocks, divided into additional blocks, and/or eliminated depending on the desired implementation.

Figures 4A, 4B:
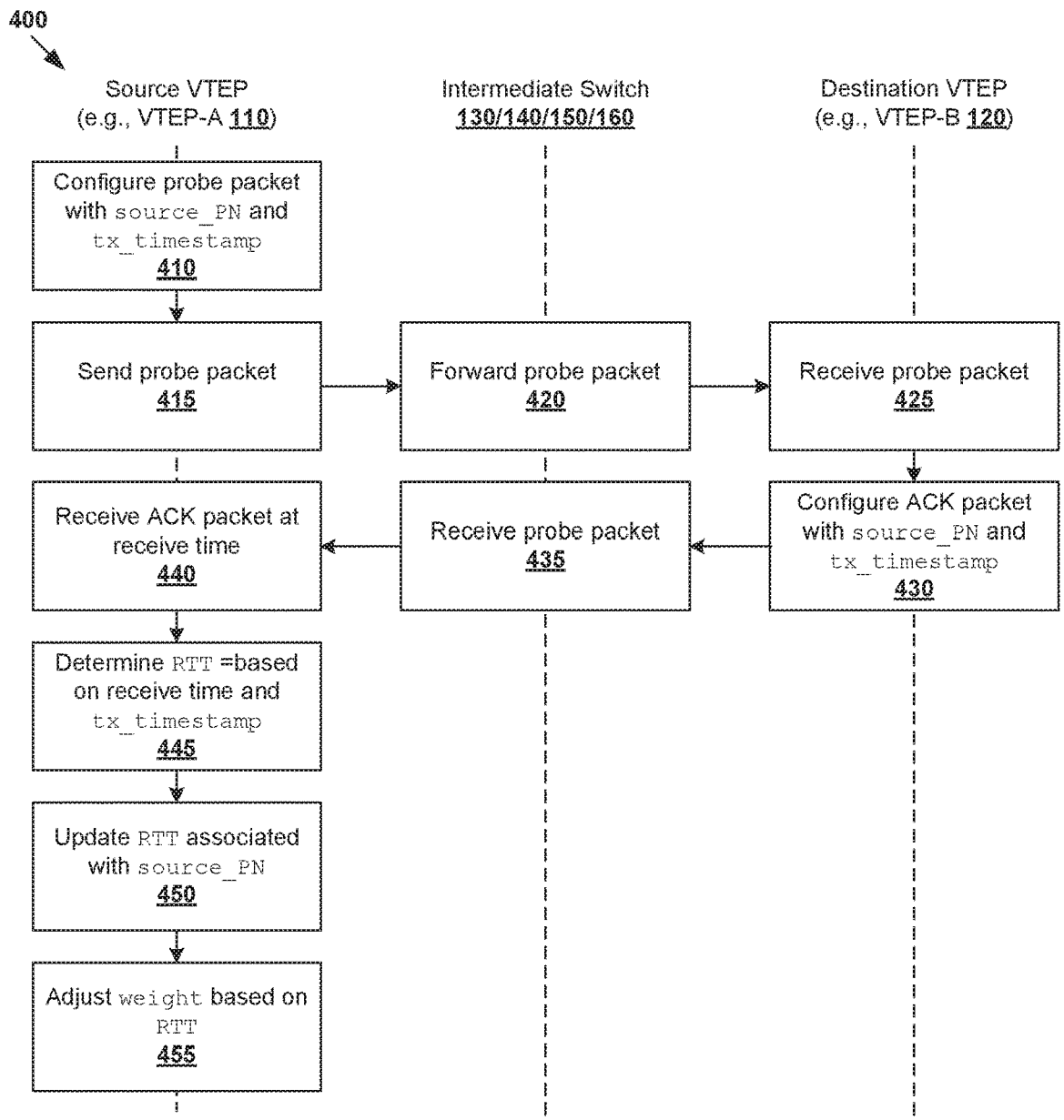
FIG. 4A is a flowchart of a second example process for a source VTEP to learn congestion state information in a data center network.
FIG. 4B is a schematic diagram illustrating example congestion state information learned according to the example in FIG. 4A.

At 410, 415 and 420 in FIG. 4A, "VTEP-A" 110 periodically sends probe packets on each path via associated switch 140/150, where each probe packet identifies a source_PN and a transmit (Tx) timestamp. At 425, 430 and 435 in FIG. 4A, "VTEP-B" 120 replies to each probe packet by sending an acknowledgement (ACK) packet that also identifies the source_PN and Tx timestamp via switch 140/150. At 440 and 445 in FIG. 4A, in response to receiving an ACK packet at a particular receive time, "VTEP-A" 110 may determine the RTT based on difference between the receive time and the Tx timestamp. At 450 and 455 in FIG. 4A, "VTEP-A" 110 associates the RTT with the source_PN, and adjusts a weight associated with the path.

FIG. 4B is a schematic diagram illustrating example congestion state information 460 learned using the example in FIG. 4A. For example, the first path via "S1" 140 is associated with source_PN=SP1 (see 462), path_ID=P1 (see 464), RTT=R1 (see 466) and weight=w1 (see 468). The second path via "S2" 150 is associated with source_PN=SP2, path_ID=P2, RTT=R2 and weight=w2. In the example in FIG. 1 where the second path has a higher congestion level than the first path, R2 should be greater than R1. In this case, w2 is adjusted to be smaller than w1 to reduce the likelihood of selecting the second path. In practice, the closer that the timestamping and acknowledgement are performed, the more accurately the RTT reflects actual network latency for the path as it does not include latency introduced by the software stack at the transmitter and the receiver.

Data Packet Processing

According to examples of the present disclosure, load balancing may be performed at the granularity of flowlets to avoid or ameliorate packet reordering issues associated with transport layer protocols such as TCP. This may be achieved by splitting a flow of packets into multiple smaller groups called "flowlets." As used herein, the term "flowlet" may refer generally to a group or burst of packets within a flow.

Figure 5:
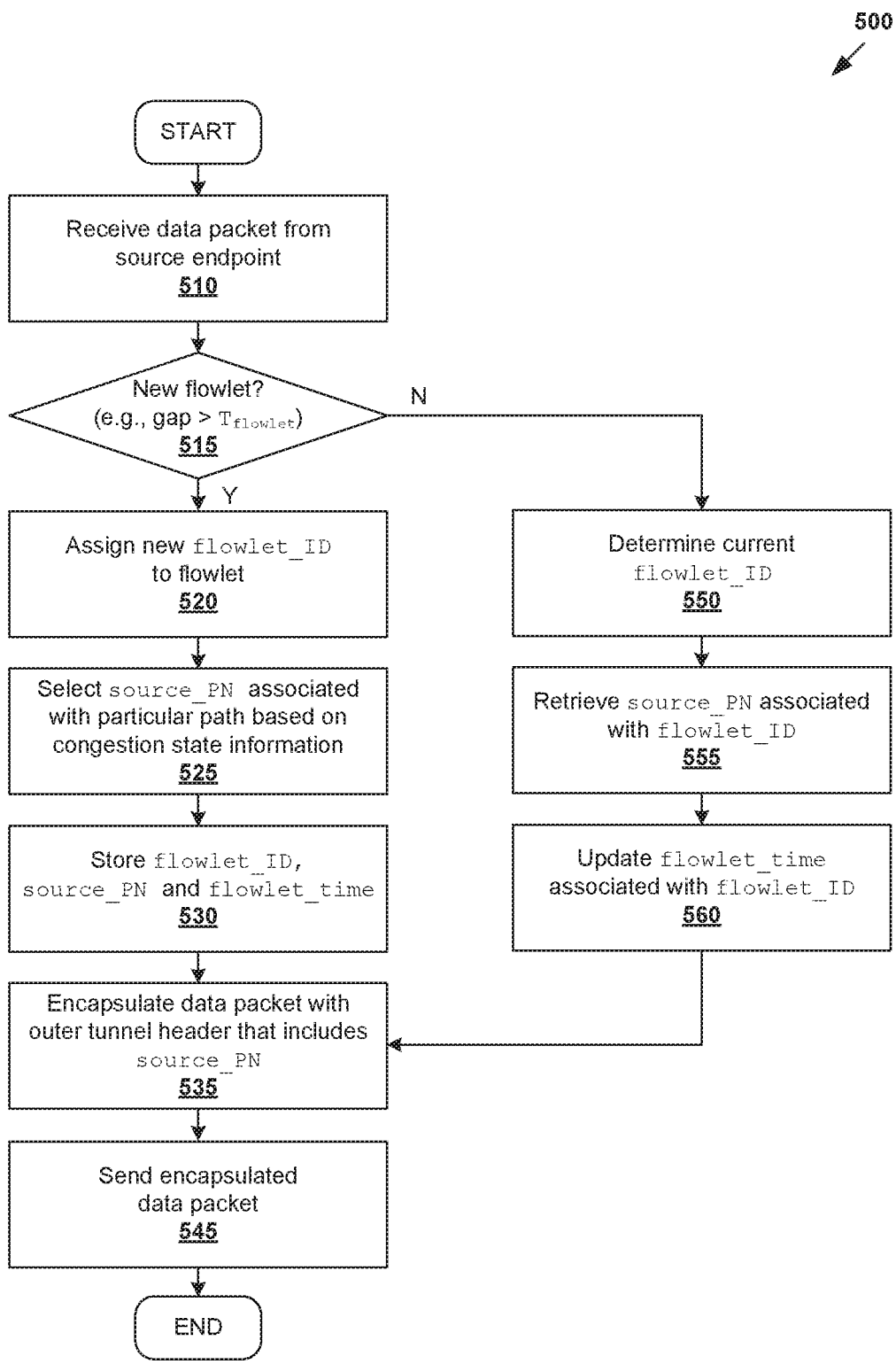
FIG. 5 is a flowchart of an example process for a source VTEP to perform data packet processing in a data center network.

FIG. 5 is a flowchart of example process 500 for virtual tunnel endpoint 110 to perform data packet processing in data center network 100. Example process 500 may include one or more operations, functions, or actions illustrated by one or more blocks, such as 510 to 560. The various blocks may be combined into fewer blocks, divided into additional blocks, and/or eliminated depending on the desired implementation.

At 510 and 515, in response to receive data packet 170 from "EP-A" 102, "VTEP-A" 110 determines whether data packet 170 belongs to a new flowlet or a current flowlet. For example, a new flowlet may be detected whenever a time interval between the arrivals of two consecutive packets within the same flow (i.e., inter-packet gap) exceeds a predetermined threshold (e.g., $T_{flowlet}$ seconds; see 515). All subsequent packets that do not exceed the threshold are considered to be part of the same flowlet. The two scenarios are discussed below.

(a) When a new flowlet is detected (i.e., inter-packet gap>$T_{flowlet}$ or first packet of the flow is detected), "VTEP-A" 110 assigns a new flowlet_ID (e.g., "F1") to data packet 170 at 520 in FIG. 5. At 525 in FIG. 5, a path identified by path_ID (e.g., "P1") is selected for the new flowlet (see 525) based on congestion state information 190/460 at that time. At 530 in FIG. 5, source_PN associated with the selected path is determined, an association between flowlet_ID and source_PN (e.g., "SP1") associated with the selected path is stored. "VTEP-A" 110 also stores flowlet_time to record the time at which the most recent data packet 170 of the flowlet is received.

(b) When data packet 170 of an existing flowlet is detected (i.e., inter-packet gap=current time−flowlet_time≤$T_{flowlet}$), "VTEP-A" 110 retrieves the current flowlet_ID (e.g., "F1") and associated source_PN (e.g., "SP1") at 550 and 555 in FIG. 5. Similarly, at 560 in FIG. 5, "VTEP-A" 110 also stores flowlet_time to record the time at which the most recent data packet 170 of the flowlet is received.

In both cases (a) and (b), example process 500 continues at 535 and 540 in FIG. 5, where "VTEP-A" 110 encapsulates data packet 170 with an outer tunnel header that is configured to include an outer source port number having the value of source_PN (e.g., "SP1") associated with flowlet_ID (e.g., "F1") and sends encapsulated data packet 172. The outer tunnel header also includes a source IP address associated with "VTEP-A" 110, and a destination IP address associated with "VTEP-B" 120. At the destination, the outer tunnel header is removed by "VTEP-B" 120 before the packet is forwarded to "EP-B" 104.

It should be understood that the above may be repeated for subsequent data packets 170 that belong to another flowlet, such as flowlet_ID="F2" when the inter-packet gap is exceeded at 515 in FIG. 4. In this case, congested state information 190/460 may have changed, and the second path via "S2" 150 (i.e., path_ID=P2) may now be selected instead of the first path via "S1" 140. In this case, associated source_PN=SP2 is included in the outer header information such that encapsulated data packets 172 are forwarded by "A1" 130, "S2" 150 and "A2" 160 along the second path to "VTEP-B" 120.

Using examples of the present disclosure, "VTEP-A" 110 remembers the flowlet_ID of a new flowlet, and reuses the associated source_PN for packets of the same flowlet. In practice, threshold $T_{flowlet}$ may be set based on the estimated RTT in the network (e.g., in the order of RTT). A large inter-packet gap between flowlets ensures that when multiple flowlets (that are technically part of the same flow) take different paths, the resulting packet reordering is minimal. Further, "VTEP-A" 110 may assign the outer source port number with minimal congestion to each new flowlet to ensure that they take the selected path. This in turn keeps the queues on all the active paths substantially low at all times, thereby leading to better throughput and latency for workloads.

Examples of the present disclosure are implemented in a manner that is oblivious to end-user guest virtual machines (e.g., acting as "EP-A" 102 and "EP-B" 104) by configuring "VTEP-A" 110 to split a network flow into multiple uncongested paths in a manner completely oblivious to the guest virtual machines. In one example, both source virtual switch (e.g., acting as "VTEP-A" 110) and destination virtual switch (e.g., acting as "VTEP-B 120) may be used. In this case, a flow may be divided into flowlets arbitrarily, and not contingent upon an idle gap between flowlets.

For example, each TCP segmentation offload (TSO) segment may be treated as a flowlet. If flowlets arrive out of order at the destination virtual switch because of the different paths taken, the destination virtual switch may reorder the flowlets before delivering them to the destination endpoint (e.g., guest virtual machine). This allows the destination virtual switch to hide the out-of-order arrival from the destination protocol stack (e.g., TCP/IP stack) of the destination endpoint, preventing the destination protocol stack from slowing down the source protocol stack at the source endpoint due to the out-of-order delivery.

Examples of the present disclosure may be deployed in the virtual switch of a hypervisor leading to intelligent path selection from the first point of entry of traffic. For example, there could be multiple ECMP paths from the virtual switch onwards, each path using a different physical NIC. In this case, examples of the present disclosure may be implemented using a host that includes a processor, and a non-transitory computer-readable storage medium storing a set of instructions. In response to execution by the processor, the set of instructions cause the processor to implement a source VTEP (e.g., "VTEP-A" 110 at a virtual switch supported by the host) to perform congestion-aware load balancing in data center network 100 according to the examples in FIG. 1 to FIG. 5.

In one example, the source VTEP implemented by the host may learn, based on first packets from the destination VTEP, congestion state information associated with multiple paths provided by respective multiple intermediate switches connecting the source VTEP with the destination VTEP. Also, in response to receiving second packets that are sent by a source endpoint and destined for a destination endpoint associated with the destination VTEP, the source VTEP may select a particular path from multiple paths based on the congestion state information, generate encapsulated second packets by encapsulating each of the second packets with header information that includes a set of tuples associated with the particular path, and send the encapsulated second packets to the destination endpoint such that the encapsulated second packets are forwarded via the particular path based on the set of tuples.

In scenarios where all physical NICs connect to the same layer-3 next-hop and path diversity starts beyond the first-hop switch (e.g., ToR switch), examples of the present disclosure may be implemented in the NIC driver/hardware or on the first-hop switch at faster speeds than in the virtual switch software. Compared to conventional approaches that require advanced switch architectures, examples of the present disclosure may be performed in the edge hypervisor (e.g., entirely in software) and scale to any number of hops between sources and destinations. In this case, examples a (first-hop) switch may be used to implement a source VTEP (e.g., "VTEP-A" 110) to perform congestion-aware load balancing in data center network 100 according to the examples in FIG. 1 to FIG. 5. The switch may include any suitable switch logic, such as hardware logic (e.g., hardware circuitry), programmable logic, a combination thereof, etc.

In one example, the switch may include first port(s), second port(s) and a switch logic. The first port(s) may be used to receive first packets from a destination VTEP connected to the source VTEP via multiple paths provided by respective multiple intermediate switches connecting the source VTEP with the destination VTEP. The second port may used to receive second packets that are sent by the source endpoint and destined for the destination endpoint associated with the destination VTEP. The switch logic may be configured to learn congestion state information associated with the multiple paths based on the first packets. In response to receiving the second packets. switch logic may be configured to select a particular path from multiple paths based on the congestion state information, generate encapsulated second packets by encapsulating each of the second packets with header information that includes a set of tuples associated with the particular path, and send the encapsulated second packets to the destination endpoint such that the encapsulated second packets are forwarded via the particular path based on the set of tuples.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), programmable switch architectures, and others. The term 'processor' is to be interpreted broadly to include a processing unit, ASIC, logic unit, or programmable gate array, etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, where the elements or procedure shown in the drawings are not necessarily essential for implementing the present disclosure. Those skilled in the art will understand that elements in the examples can be arranged in the device in the examples as described, or can be alternatively located in one or more devices different from that in the examples. The elements in the examples described can be combined into one module or further divided into a plurality of sub-elements.

We claim:

1. A method for a source tunnel endpoint to perform congestion-aware load balancing in a data network that includes the source tunnel endpoint, a destination tunnel endpoint, a source endpoint, a destination endpoint and multiple intermediate network elements, the method comprising:
    learning, by the source tunnel endpoint based on first packets from the destination tunnel endpoint, congestion state information associated with a plurality of paths provided by respective multiple intermediate network elements connecting the source tunnel endpoint with the destination tunnel endpoint, wherein the congestion state information includes a mapping among the plurality of paths, a plurality of outer source port numbers corresponding to the plurality of paths, and congestion status for the plurality of paths;
    receiving, by the source tunnel endpoint, second packets that are sent by the source endpoint and destined for the destination endpoint associated with the destination tunnel endpoint;
    selecting, by the source tunnel endpoint, a particular path from the plurality of paths based on the congestion state information;
    generating, by the source tunnel endpoint, encapsulated second packets by encapsulating each of the second packets with header information that includes a set of tuples associated with the particular path, wherein the encapsulating each of the second packets comprises:
        determining, from the plurality of outer source port numbers, a particular outer source port number associated with the particular path; and
        configuring the set of tuples in the header information in each of the second packets to include the particular outer source port number; and
    sending, by the source tunnel endpoint, the encapsulated second packets to the destination endpoint such that the encapsulated second packets are forwarded via the particular path based on the set of tuples.

2. The method of claim 1, wherein learning the congestion state information comprises:
    determining a congestion flag associated with the particular path based on a particular first packet from the destination tunnel endpoint, wherein the particular first packet includes a congestion notification from at least one of the multiple intermediate network elements to indicate whether the particular path is congested.

3. The method of claim 1, wherein learning the congestion state information comprises:
    determining a round trip time associated with the particular path based on a receive time of a particular first packet from the destination tunnel endpoint, and a transmit time of a probe packet sent by the source tunnel endpoint to trigger the particular first packet.

4. The method of claim 1, wherein learning the congestion state information comprises:
    prior to the selecting the particular path, based on a particular first packet from the destination tunnel endpoint, determining a weight associated with the particular path to increase or decrease its likelihood for selection.

5. The method of claim 1, wherein the method further comprises:
    assigning each of the second packets, being a current second packet, to a flowlet based on an inter-packet gap between the current second packet and a previous second packet destined for the destination endpoint; and
    storing flowlet information that associates the flowlet with the particular outer source port number associated with the particular path.

6. A non-transitory computer-readable storage medium that includes a set of instructions which, in response to execution by a processor of a host, cause the processor to implement a source tunnel endpoint to perform a method of congestion-aware load balancing in a data network that includes the source tunnel endpoint, a destination tunnel endpoint, a source endpoint, a destination endpoint and multiple intermediate network elements, wherein the host supports the source tunnel endpoint, and the method comprises:
    learning, by the source tunnel endpoint based on first packets from the destination tunnel endpoint, congestion state information associated with a plurality of paths provided by respective multiple intermediate network elements connecting the source tunnel endpoint with the destination tunnel endpoint, wherein the congestion state information includes a mapping among the plurality of paths, a plurality of outer source port numbers corresponding to the plurality of paths, and congestion status for the plurality of paths;
    receiving, by the source tunnel endpoint, second packets that are sent by the source endpoint and destined for the destination endpoint associated with the destination tunnel endpoint;
    selecting, by the source tunnel endpoint, a particular path from the plurality of paths based on the congestion state information;
    generating, by the source tunnel endpoint, encapsulated second packets by encapsulating each of the second packets with header information that includes a set of tuples associated with the particular path, wherein the encapsulating each of the second packets comprises:
        determining, from the plurality of outer source port numbers, a particular outer source port number associated with the particular path; and configuring the set of tuples in the header information in each of the second packets to include the particular outer source port number; and sending, by the source tunnel endpoint, the encapsulated second packets to the destination endpoint such that the encapsulated second packets are forwarded via the particular path based on the set of tuples.

7. The non-transitory computer-readable storage medium of claim 6, wherein learning the congestion state information comprises:

determining a congestion flag associated with the particular path based on a particular first packet from the destination tunnel endpoint, wherein the particular first packet includes a congestion notification from at least one of the multiple intermediate network elements to indicate whether the particular path is congested.

8. The non-transitory computer-readable storage medium of claim 6, wherein learning the congestion state information comprises:

determining a round trip time associated with the particular path based on a receive time of a particular first packet from the destination tunnel endpoint, and a transmit time of a probe packet sent by the source tunnel endpoint to trigger the particular first packet.

9. The non-transitory computer-readable storage medium of claim 6, wherein learning the congestion state information comprises:

prior to the selecting the particular path, based on a particular first packet from the destination tunnel endpoint, determining a weight associated with the particular path to increase or decrease its likelihood for selection.

10. The non-transitory computer-readable storage medium of claim 6, wherein the method further comprises:

assigning each of the second packets, being a current second packet, to a flowlet based on an inter-packet gap between the current second packet and a previous second packet destined for the destination endpoint; and storing flowlet information that associates the flowlet with the particular outer source port number associated with the particular path.

11. A network element configured to implement a source tunnel endpoint to perform congestion-aware load balancing in a data network, wherein the network element comprises:

one or more first ports to receive first packets from a destination tunnel endpoint connected to the source tunnel endpoint via a plurality of paths provided by respective multiple intermediate network elements connecting the source tunnel endpoint with the destination tunnel endpoint;

a second port to receive second packets that are sent by the source endpoint and destined for the destination endpoint associated with the destination tunnel endpoint; and the network element is configured to:

learn congestion state information associated with the multiple paths based on the first packets, wherein the congestion state information includes a mapping among the plurality of paths, a plurality of outer source port numbers corresponding to the plurality of paths, and congestion status for the plurality of paths;

in response to receiving the second packets, select a particular path from the plurality of paths based on the congestion state information;

generate encapsulated second packets by encapsulating each of the second packets with header information that includes a set of tuples associated with the particular path, wherein the encapsulating each of the second packets comprises:

determining, from the plurality of outer source port numbers, a particular outer source port number associated with the particular path; and configuring the set of tuples in the header information in each of the second packets to include the particular outer source port number; and send the encapsulated second packets to the destination endpoint such that the encapsulated second packets are forwarded via the particular path based on the set of tuples.

12. The network element of claim 11, wherein the network element is configured to learn the congestion state information by determining a congestion flag associated with the particular path based on a particular first packet from the destination tunnel endpoint, wherein the particular first packet includes a congestion notification from at least one of the multiple intermediate network elements to indicate whether the particular path is congested.

13. The network element of claim 11, wherein the network element is configured to learn the congestion state information by determining a round trip time associated with the particular path based on a receive time of a particular first packet from the destination tunnel endpoint, and a transmit time of a probe packet sent by the source tunnel endpoint to trigger the particular first packet.

14. The network element of claim 11, wherein the network element is configured to, prior to the selection of the particular path, learn the congestion state information by determining a weight associated with the particular path to increase or decrease its likelihood for selection based on a particular first packet from the destination tunnel endpoint.

15. The network element of claim 11, wherein the network element is further configured to:

assign each of the second packets, being a current second packet, to a flowlet based on an inter-packet gap between the current second packet and a previous second packet destined for the destination endpoint; and store flowlet information that associates the flowlet with the particular outer source port number associated with the particular path.

* * * * *